United States Patent [19]

Hutch

[11] 4,264,893
[45] Apr. 28, 1981

[54] DATA COMMUNICATION SYSTEM

[75] Inventor: Frederick S. Hutch, Warminster, Pa.

[73] Assignee: Honeywell Inc., Minneapolis, Minn.

[21] Appl. No.: 669,442

[22] Filed: Mar. 23, 1976

Related U.S. Application Data

[63] Continuation of Ser. No. 436,659, Jan. 25, 1974, abandoned.

[51] Int. Cl.³ .............................................. H04Q 5/00
[52] U.S. Cl. ........................... 340/147 SC; 340/147 R
[58] Field of Search ...................... 340/147 SC, 147 R

[56] References Cited

U.S. PATENT DOCUMENTS 3,899,641 8/1975 Etra .................................. 179/18 EA Primary Examiner—Harold I. Pitts
Attorney, Agent, or Firm—Laurence J. Marhoefer; Lockwood D. Burton; Mitchell J. Halista

[57] ABSTRACT

A data communication system having a pair of data signal carrying conductors with each conductor providing an independent data link between a central station and a remote, or field, station. The data signal carrying conductors are each routed over a separate path different from any other conductor path between the central station and the remote station and are selectively substituted for use as a data signal carrying conductor upon the detection of an error in the operation of the data conductor currently in use.

5 Claims, 1 Drawing Figure

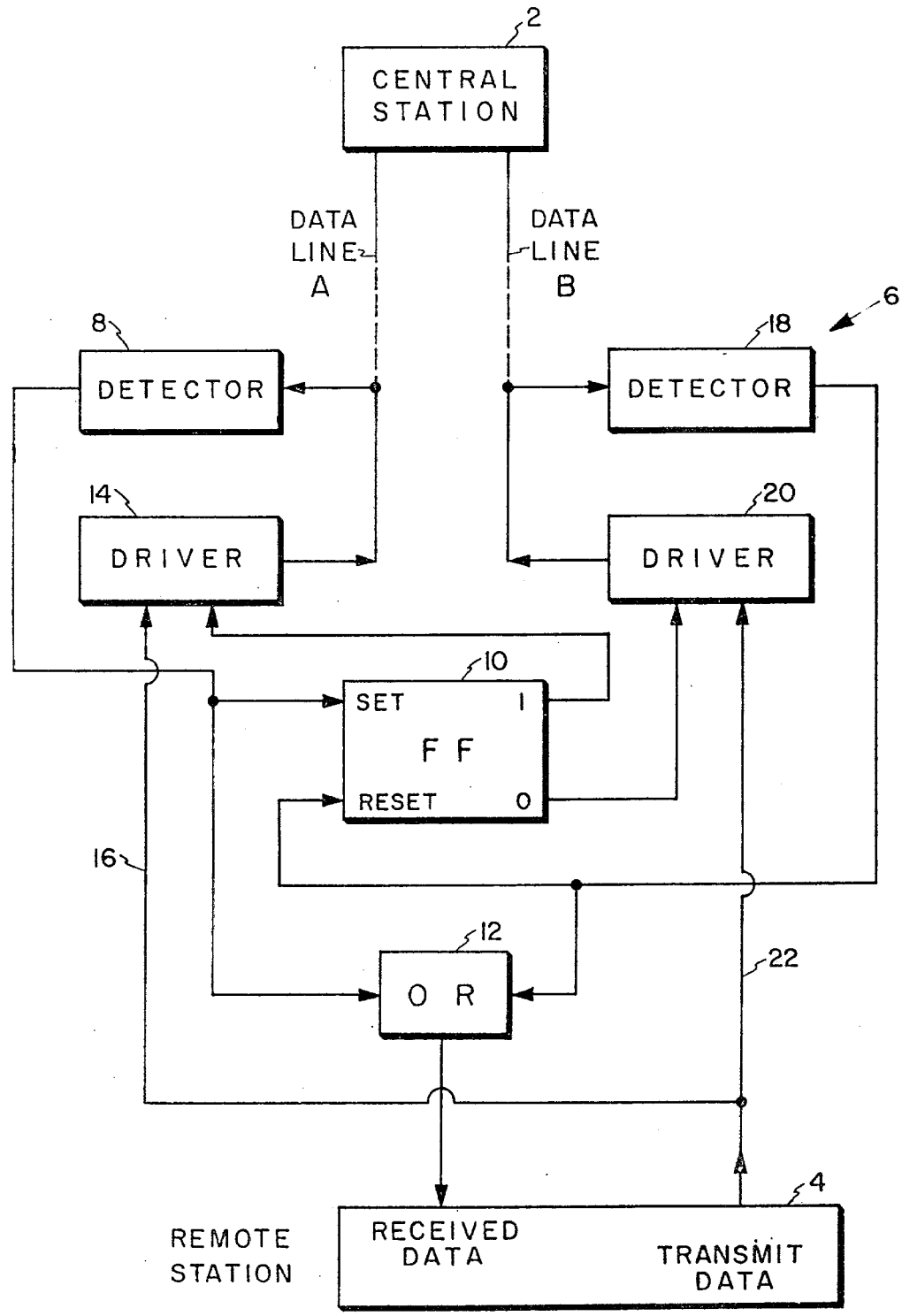

DATA COMMUNICATION SYSTEM

This is a continuation of application Ser. No. 436,659 filed on Jan. 25, 1974.

BACKGROUND OF THE INVENTION

1. Field of the Invention

The present invention relates to data communication systems. More specifically, the present invention is directed to a data communication system using redundant data signal carrying conductors for providing a fail-safe data communicating path between a central station and a remote station.

2. Description of the Prior Art

The field of process control usually involves the gathering of data representing process variables from remote and environmentally hazardous locations and the transmission of this data to a central station. The use of data signal carrying cables, or conductors, in data communication links between the central station and such locations imposes upon the process control system, the added hazard of a loss of a data communication link by way of damage to a data cable. In many process control systems, e.g., chemical plant systems, the loss of a data communication link could lead to disastrous consequences in the event of a loss of control in contemporary automated process control systems. In order to attempt to avoid such a loss of a vital data communication link, a prior art solution has been to extensively protect the data cables against forseeable hazards. Such protective enclosures are often effective to make the control system impractical as well as uneconomical and cannot protect the data cables against all hazards. Accordingly, it is desirable to provide a data communication system having means for automatically maintaining data communication links to prevent a loss of data between a remote location and a central station.

SUMMARY OF THE INVENTION

An object of the present invention is to provide a data communication system having redundant data signal carrying conductors forming a fail-safe data communication system.

In accomplishing this and other objects, there has been provided, in accordance with the present invention, a data communication system having a plurality of data signal carrying conductors connecting a central station with a remote station. Each of the data conductors is arranged to provide an independent data communication path between the remote station and the central station while a fault detecting means is arranged to substitute an unused data conductor for a data conductor presently in use following the detection of a fault in the presently used conductor. The newly selected data conductor is substituted electrically for the former data conductor by transferring the data signal path from the former conductor to the newly selected conductor.

BRIEF DESCRIPTION OF THE DRAWING

A better understanding of the present invention may be had when the following detailed description is read in connection with the accompanying drawing, in which the single FIGURE is a block diagram of a data communication system embodying the present invention.

DESCRIPTION OF THE PREFERRED EMBODIMENT DETAILED DESCRIPTION

Referring to the single FIGURE drawing in more detail, there is shown a data communication system for providing a data communication path between a central station 2 and a remote station 4. A first data conductor "A" is arranged to connect the central station 2 with the remote station 4 along a first predetermined path. A second data conductor "B" is, also, arranged to connect the central station 2 to the remote station 4 along a second predetermined path which is different from the first predetermined path in order to prevent an event which would incapacitate one data conductor from affecting the other data conductor. A data conductor switching network 6 is used to connect the ends of the data conductors "A" amd "B" to the remote station 2 and to provide a means for automatically selecting an operative data conductor to use as a communication path between the central station 2 and the remote station 4. A data conductor is initially selected by the central station 2 by applying a predetermined, or check, signal to one of the data lines "A" and "B" by any suitable means, such devices being well-known in the art. The central station 2 also includes signal detectors for sensing signals received on the data lines "A" and "B", check signal generating and transmitting means and a multiplexer for switching the check signal between the data lines "A" and "B", as discussed hereinafter, such devices also being well-known in the art.

For the purposes of the following discussion, it is assumed that the data conductor "A" is initially selected by the central station 2. A first signal detector 8 is provided at the remote station end of the data conductor "A" to detect the transmission of the aforesaid predetermined check signal from the central station 2. The detector 8 may be any suitable device for providing an output signal in response to a specific, e.g., coded, input signal applied thereto, such devices being well-known in the art. An output signal from the detector 8 is applied to a "set" input terminal of a flip-flop 10 and to a first input of an OR gate 12. The output signal from the OR gate 12 is applied to a received data input terminal of the remote station 4. The input signal to the flip-flop 10 is effective to set the flip-flop 10 to the "1" state. An output signal from the "1" output terminal of the flip-flop 10 is applied to a driver circuit 14 to enable the driver circuit 14 to transmit output signals. The output circuit of the driver 14 is connected to the data line "A". An input signal to the driver 14 is obtained from a transmit data output terminal of the remote station 4 along output data line 16.

In order to provide for an effective means of checking whether or not the predetermined check signal from the central station 2 has arrived at the remote station 4, the remote station 4 includes means for sending back an acknowledgement signal from the transmit data output terminal by any suitable device responsive to the check signal, such devices also being well-known in the art. This acknowledgement signal is applied along line 16 to the driver 14 to produce an output signal on the data line "A" for transmission to the central station 2. If an acknowledgement signal is not received by the central station 2 within a predetermined time after the transmission of the check signal to the remote station 4 by the central station 2, such a condition is indicative of a fault in the data line "A" which is interfering with the signal communication between the central station 2 and the remote station 4.

Upon the occurrence of such a lack of acknowledgement by the remote station 4, the central station 2 is arranged to automatically switch to the second data line "B". The predetermined, or check, signal is then applied by the central station 2 to the substituted data line "B" for transmission to the remote station 4. The predetermined signal on the data line "B" is detected by a second detector 18. The output signal from the second detector 18 is applied to the "reset" input terminal of the flip-flop 10 and to a second input of the OR gate 12. The input signal to the "reset" input terminal of the flip-flop 10 is effective to switch the flip-flop 10 to the "0" state. An output signal from the "0" output terminal of the flip-flop 10 is applied as an enable signal to a second driver 20. An input signal for the second driver 20 is obtained from the transmit data output terminal of the remote station 4 along a second output line 22. The output signal from the second driver 20 is applied to the second data line B. The acknowledgement signal from the remote station 4 in response to the check signal applied to the data line "B" is applied to the second driver 20 for transmission to the central station 2 along the second data line "B".

In the event that an acknowledgement signal from the remote station 4 is not received by the central station 2 after the substitution of the data line "B", the central station 2 may be arranged to return to the first data line "A" for a recycle of the operation as described above. In extremely hazardous locations, the communication system may include additional data lines between the central station 2 and the remote station 4 which additional data lines may be sequentially tried by the central station 2 until an operative transmission link is established.

Accordingly, it may be seen that it has been provided, in accordance with the present invention, a data communication system having a plurality of data signal carrying conductors connecting a remote station with a central station and including means for automatically selecting an operative one of the conductors to maintain a data communication link between the central station and the remote station.

The embodiments of the invention in which an exclusive property or privilege is claimed are defined as follows:

1. A data communication system connecting a central station with a remote station comprising
    a plurality of data signal carrying conductors connected at one end to said central station,
    central station receiving and transmitting means arranged to apply check signals to each of said signal carrying conductors in succession until a response is obtained from said remote station as represented by an acknowledgement signal from said remote station being received at said central station means over the same one of said signal carrying conductors to which said check signal was applied by said central station means, said signal carrying conductors being used only for the check signal, acknowledgement signal and data signal carrying operations conducted between the central station and the remote station,
    remote station receiving and transmitting means arranged to receive data and check signals from said central station receiving and transmitting means and to transmit data and acknowledgement signals to said central station, and
    detecting means located at the remote station between all of said data signal carrying conductors and said remote station and arranged to detect an operative condition of any one of said data signal carrying conductors by detecting the presence of said check signal received thereon from said central station and to route data and acknowledgement signals transmitted from said remote station on to the detected operative one of said data signal carrying conductors to form a data transmission system with said central station and to apply data signals from said central station received over the detected operative one of said data signal carrying conductors to said remote station, said detecting means including means responsive to said check signal from said central station for each of said signal carrying conductors to produce a respective output signal representative of the detection of said check signal and enabling means responsive to said output signal from all of said last-mentioned means for enabling the data transmitting operation from said remote station over the detected operative one of said signal carrying conductors.

2. A data communication system as set forth in claim 1 wherein said plurality of data signal carrying conductors are each disposed along a different physical path between said central station and said remote station.

3. A data communication system as set forth in claim 1 wherein said plurality of data signal carrying conductors includes a first conductor and a second conductor and said means responsive to said check signals includes a first responsive means connected to receive signals from said first conductor and to produce a representative output signal and a second responsive means connected to receive signals from said second conductor and to produce a representative output signal.

4. A data communication system as set forth in claim 3 wherein said enabling means includes a flip-flop having a first input connected to an output signal from said first responsive means and a second input connected to an output signal from said second responsive means, a first data communication means connected between said remote station and said first conductor and a second data communication means connected between said remote station and said second conductor, said flip-flop having a first output signal arranged to be applied as an enabling signal to said first data communication means to establish a data signal path between said remote station and said first conductor and a second output signal arranged to be applied as an enabling signal to said second data communication means to establish a data signal path between said remote station and said second conductor.

5. A data communication system as set forth in claim 4 wherein said remote station has a receive circuit means, a transmit circuit means, and an OR gate connected between said receive circuit means and said first and second responsive means to pass data signals from said first and second responsive means to said receive circuit means and a circuit connecting said transmit means to said first and said second data communication means.

* * * * *